(12) United States Patent  (10) Patent No.: US 8,094,519 B2
Lagakos et al.  (45) Date of Patent: Jan. 10, 2012

(54) INTENSITY MODULATED FIBER OPTIC HYDROPHONES

(75) Inventors: Nicholas Lagakos, Silver Spring, MD (US); Joseph A. Bucaro, Herndon, VA (US); Jacek Jarzynski, Bethesda, MD (US); Barbara Jarzynski, legal representative, Bethesda, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/210,925

(22) Filed: Aug. 16, 2011

(65) Prior Publication Data

US 2011/0305116 A1    Dec. 15, 2011

Related U.S. Application Data

(63) Continuation of application No. 13/019,633, filed on Feb. 2, 2011, now abandoned, which is a continuation-in-part of application No. 12/859,342, filed on Aug. 19, 2010, now abandoned.

(60) Provisional application No. 61/235,180, filed on Aug. 19, 2009.

(51) Int. Cl.
*G01H 9/00* (2006.01)
(52) U.S. Cl. .......................... 367/149; 367/171; 367/174
(58) Field of Classification Search .................. 367/149, 367/171, 172, 174; 73/653
See application file for complete search history.

(56) References Cited

U.S. PATENT DOCUMENTS

| | | | |
|---|---|---|---|
| 5,146,083 A | 9/1992 | Zuckerwar et al. | |
| 5,247,490 A * | 9/1993 | Goepel et al. | 367/149 |
| 5,311,485 A * | 5/1994 | Kuzmenko et al. | 367/149 |
| 5,625,724 A | 4/1997 | Frederick et al. | |
| 6,998,599 B2 | 2/2006 | Lagakos et al. | |
| 7,020,354 B2 | 3/2006 | Lagakos et al. | |
| 7,149,374 B2 | 12/2006 | Lagakos et al. | |
| 7,369,716 B2 * | 5/2008 | Berg et al. | 385/12 |
| 7,379,630 B2 | 5/2008 | Lagakos et al. | |
| 7,460,740 B2 | 12/2008 | Lagakos et al. | |
| 7,466,631 B1 | 12/2008 | Ames | |
| 7,646,946 B2 | 1/2010 | Lagakos et al. | |
| 7,697,798 B2 | 4/2010 | Lagakos et al. | |
| 2004/0151417 A1* | 8/2004 | Lagakos et al. | 385/12 |
| 2006/0072887 A1* | 4/2006 | Lagakos et al. | 385/117 |
| 2009/0196543 A1 | 8/2009 | Lagakos et al. | |

OTHER PUBLICATIONS

Bucaro J.A., et al., "Fiber Optic Hydrophone", Journal of Acoustical Society of America, vol. 62, pp. 1302-1304, (1977).

(Continued)

*Primary Examiner* — Ian Lobo
(74) *Attorney, Agent, or Firm* — Amy Ressing; Sally A. Ferrett

(57) ABSTRACT

A fiber optic hydrophone has a reflective diaphragm having an exposed face and a reflective protected face, at least one transmitting multimode optical fiber having an end spaced apart from the protected face of the diaphragm positioned to emit light toward the diaphragm housing, and a reservoir. A cavity is defined by the diaphragm and the interior surface of the housing. Silicone oil and a compliant elastomeric material with embedded air bubbles are located in the cavity. Ports between the cavity and the reservoir and the reservoir and the exterior of the hydrophone allow static pressure communication between the cavity and the exterior of the hydrophone. The fiber optic probe can have one transmitting multimode optical fiber and six receiving multimode optical fibers, or more or fewer optical fibers. A grating can protect the diaphragm from environmental damage.

20 Claims, 13 Drawing Sheets

OTHER PUBLICATIONS

Cole, J. H., et al., "Fiber Optic Detection of Sound", Journal of Acoustic Society of America, vol. 62, pp. 1136-1138, (1977).

T.G. Giallorenzi, J.A. Bucaro, A. Dandridge, G.H. Sigel, J.H. Cole, S.C. Rashleigh and R.G. Priest, "Optical fiber sensor technology," IEEE Transactions on Microwave Theory and Techniques MTT-30, pp. 472-511, (1982).

N. Lagakos, J.H. Cole, and J.A. Bucaro, "Microbend fiber-optic sensor", Applied Optics, vol. 26, No. 11, pp. 2171-2180, (Jun. 1987).

M.R. Layton and J.A. Bucaro, "Optical fiber acoustic sensor utilizing mode-mode interference", Applied Optics, vol. 18, No. 5, pp. 666-670, (Mar. 1979).

D.H. McMahon, R.A. Soref, and L.E. Sheppard, "Sensitive Fieldable Photoelastic Fiber-Optic Hydrophone", Journal of Lightwave Technology, vol. LT-2, No. 4, pp. 469-478, (Aug. 1984).

P. Shajenko, J.P. Flatley, M.B. Moffett, "On fiber-optic hydrophone sensitivity", Journal of the Acoustic Society of America, vol. 64, No. 5, pp. 1286-1288, (Nov. 1978).

W.B. Spillman and D.H. McMahon, "Multimode fiber-optic hydrophone based on the photoelastic effect", Applied Optics, vol. 21, No. 19, pp. 33511-3514, (Oct. 1982).

W.B. Spillman and D.H. McMahon, "Frustrated-total-internal-reflection multimode fiber-optic hydrophone" Applied Optics, vol. 19, No. 1, pp. 113-117, (1980).

W.B. Spillman, Jr., "Multimode fiber-optic hydrophone based on a schlieren technique", Applied Optics, vol. 20, No. 3, pp. 465-470, (1981).

Z. Wang and Y. Hu, "Frequency response of fiber-optic hydrophone with a novel mechanical anti-aliasing filter of side-cavities", Communications and Photonics Conference and Exhibition, 2009 Asia, Proceedings of SPIE, vol. 7630, pp. 763024-1-763024-5, (Nov. 2009).

* cited by examiner

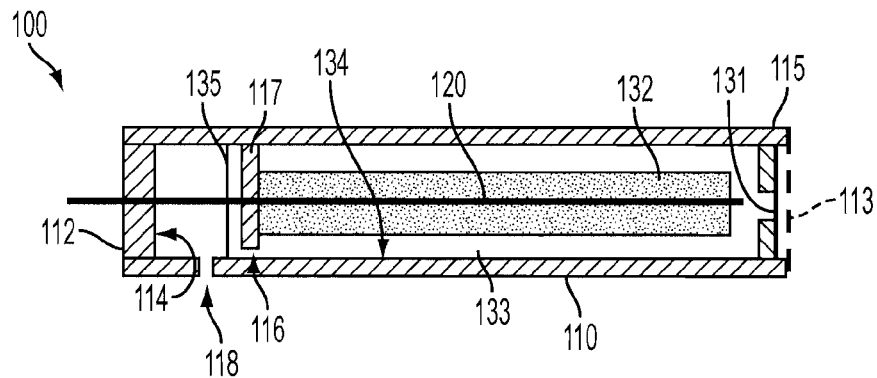
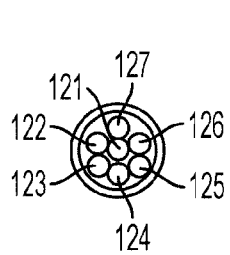 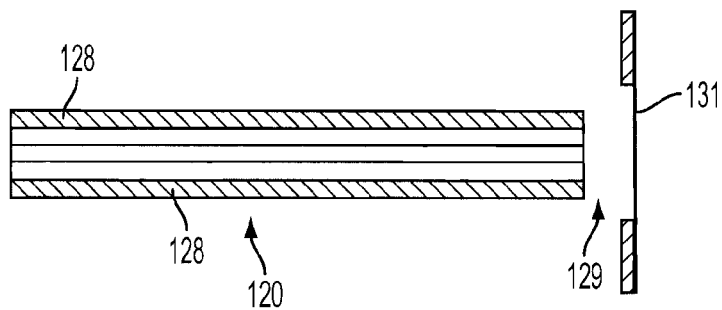
FIG. 1C            FIG. 1B
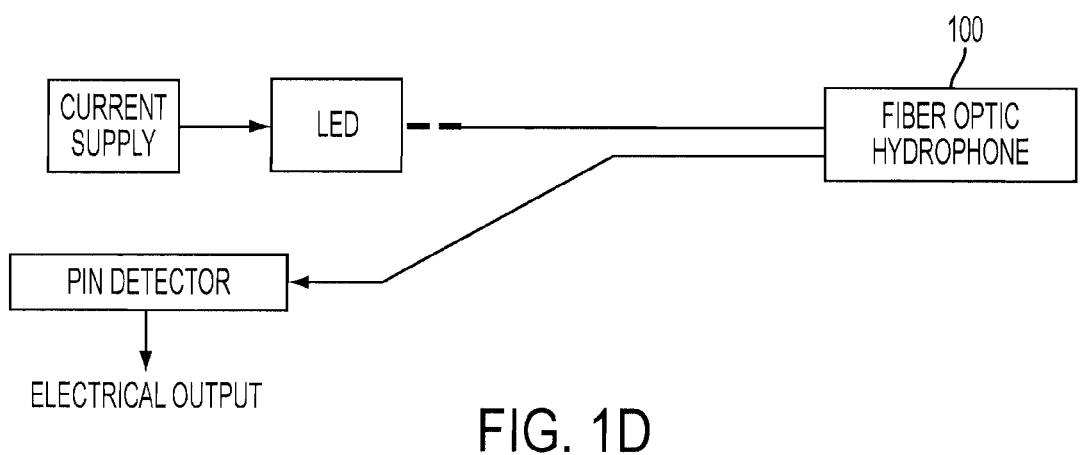
FIG. 1D

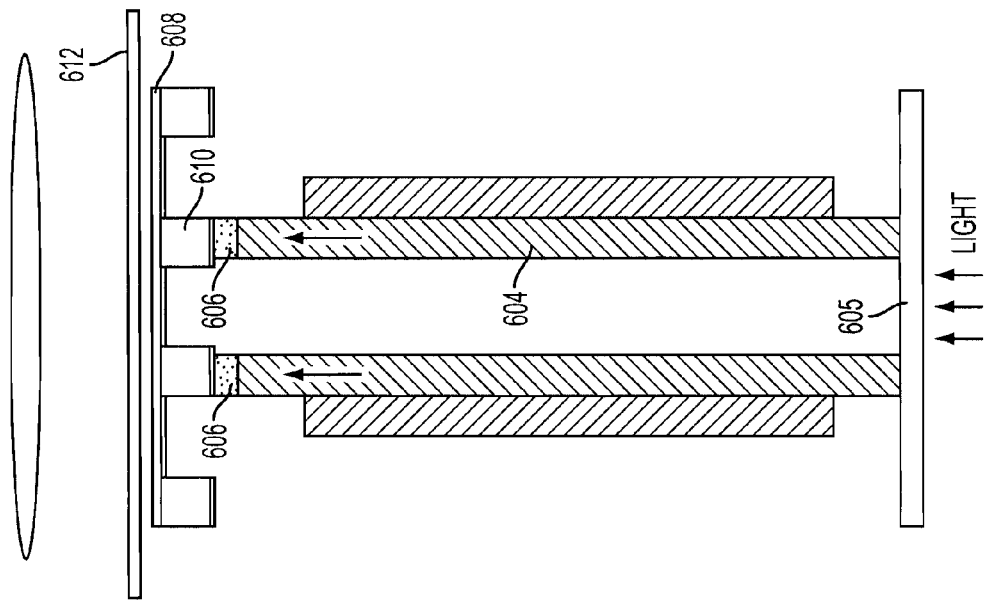
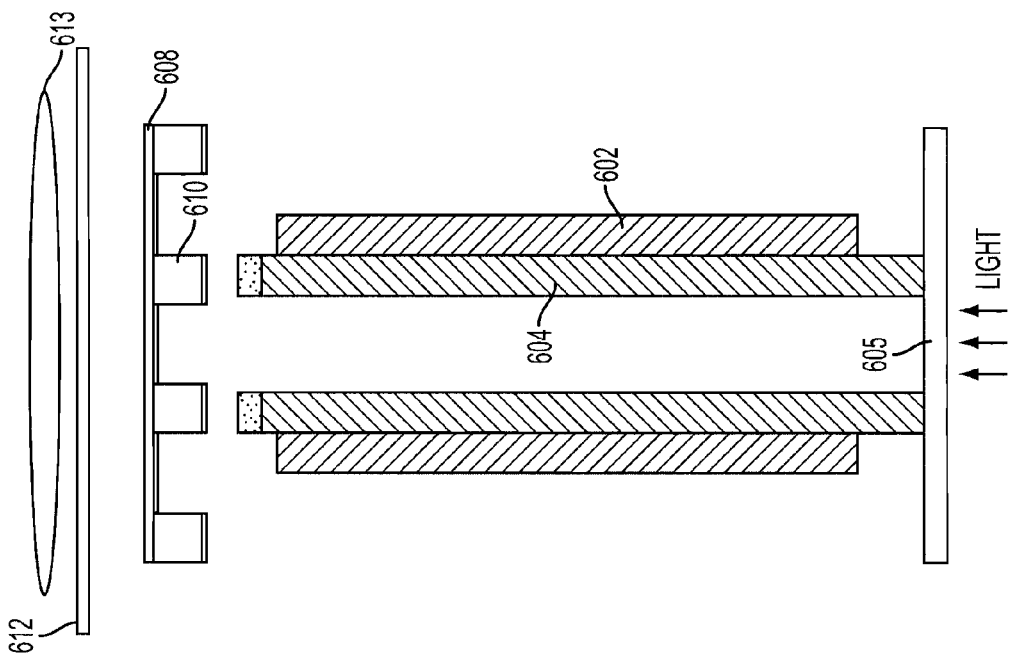

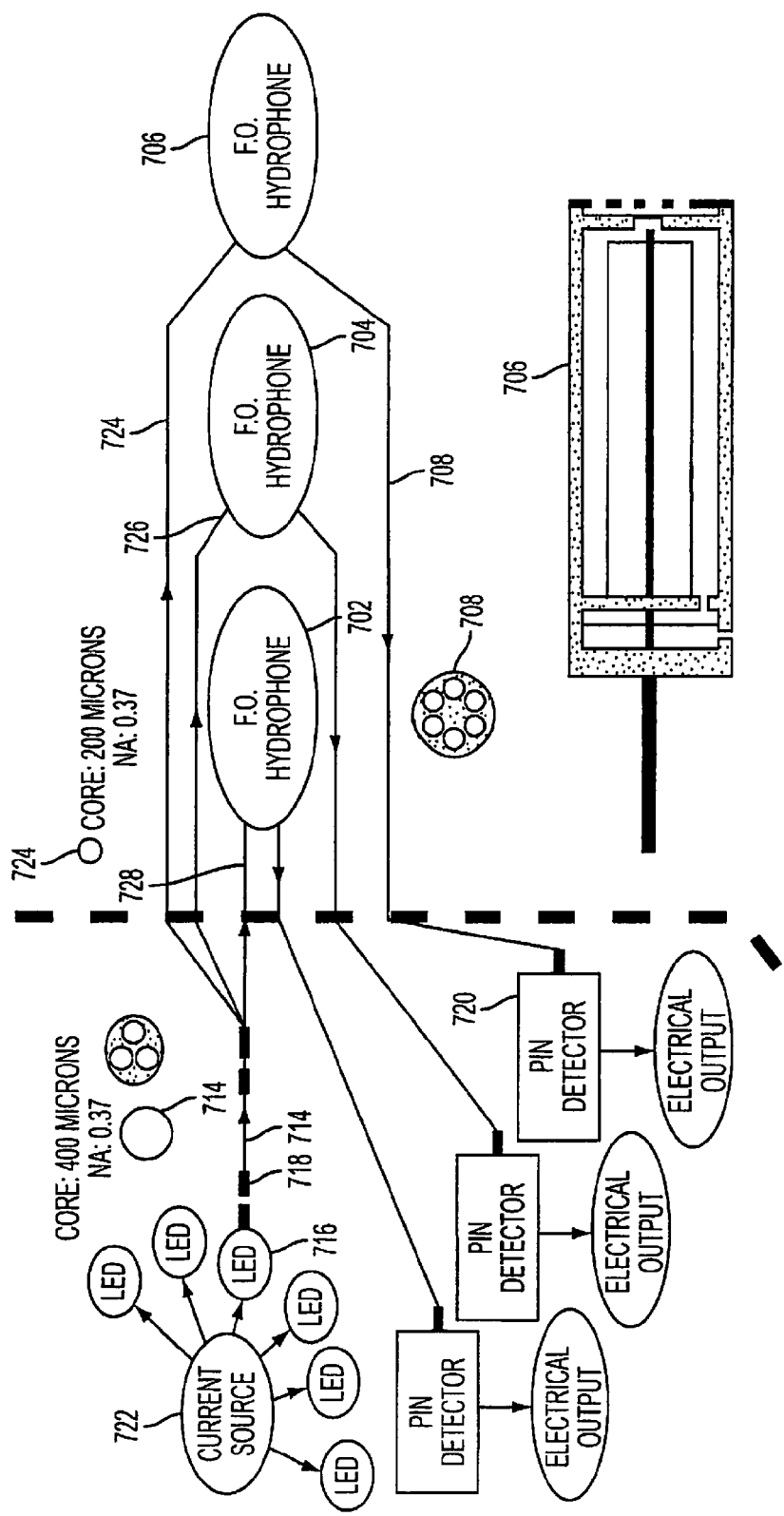

INTENSITY MODULATED FIBER OPTIC HYDROPHONES

CROSS-REFERENCE TO RELATED APPLICATIONS

This Application is a Continuation of application Ser. No. 13/019,633 filed on Feb. 2, 2011. Application Ser. No. 13/019,633 is a Continuation-in-part of application Ser. No. 12/859,342 filed on Aug. 19, 2010. Application Ser. No. 12/859,342 is a non-provisional under 35 USC 119(d) of and claims the benefit of U.S. Provisional Application 61/235,180 filed on Aug. 19, 2009. The entire disclosure of each of these documents is incorporated by reference herein.

BACKGROUND

1. Technical Field

This invention is related to fiber optic sensors, and more particularly to hydrophones and dynamic pressure sensors for use in an underwater environment.

2. Background Technology

Most commercially available hydrophones typically use a piezoelectric crystal as the sensing element. When pressure is applied on the PZT, a small surface electrical charge is generated, resulting in a small electrical voltage. The small electrical signal is typically amplified at the sensor. The electrical signal and the electronic amplifier make the device sensitive to electromagnetic interference. In addition, such PZT sensors are generally not very sensitive at frequencies below about 1 Hz.

Fiber optic sensors have also been used for sensing pressure, temperature, strain, displacement, acceleration, bending, and other environmental properties.

A fiber optic hydrophone based on a birefringent material is discussed in W. B. Spillman and D. H. McMahon, "Multimode fiber-optic hydrophone based on the photoelastic effect", Applied Optics, Vol. 21, No. 19, pp. 33511-3514, (October 1982), and in D. H. McMahon, R. A. Soref, and L. E. Sheppard, "Sensitive Fieldable Photoelastic Fiber-Optic Hydrophone", Journal of Lightwave Technology, Vol. LT-2, No. 4, pp. 469-478, (August 1984). Another fiber optic hydrophone is disclosed in W. B. Spillman and D. H. McMahon, "Frustrated-total-internal-reflection multimode fiber-optic hydrophone" Applied Optics, Vol. 19, No. 1, pp. 113-117, (1980). Another hydrophone is discussed in W. B. Spillman, Jr., "Multimode fiber-optic hydrophone based on a schlieren technique", Applied Optics, Vol. 20, No. 3, pp. 465-470, (1981).

Interferometric fiber-optic sensors are also disclosed in U.S. Pat. No. 5,625,724 to Frederick et al., which uses both a reference fiber and a sensing fiber wrapped around a rigid cylinder, and a sensing fiber wrapped around a compliant material. Sensitivity of fiber optic hydrophones is discussed in P. Shajenko, J. P. Flatley, M. B. Moffett, "On fiber-optic hydrophone sensitivity" Journal of the Acoustic Society of America, Vol. 64, No. 5, pp. 1286-1288, November 1978. A more recent interferometric fiber optic hydrophone is disclosed in Z. Wang and Y. Hu, "Frequency response of fiber-optic hydrophone with a novel mechanical anti-aliasing filter of side-cavities", Communications and Photonics Conference and Exhibition, 2009 Asia, Proceedings of SPIE, Vol. 7630, pp. 763024-1-763024-5, November 2009. Another fiber optic hydrophone is described in U.S. Pat. No. 7,466,631 to Ames, entitled "Enhanced Sensitivity Pressure Tolerant Fiber Optic Hydrophone".

Various types of intensity modulated fiber optic sensors are disclosed in U.S. Pat. No. 6,998,599 to Lagakos et al., U.S. Pat. No. 7,379,630 to Lagakos et al., U.S. Pat. No. 7,460,740 to Lagakos et al., U.S. Pat. No. 7,020,354 to Lagakos et al., U.S. Pat. No. 7,697,798 to Lagakos et al., and U.S. Patent Application Publication 20090196543, the disclosures of which are incorporated herein by reference in their entireties.

A multimode fiber optic acoustic sensor is described in M. R. Layton and J. A. Bucaro, "Optical fiber acoustic sensor utilizing mode-mode interference", Applied Optics, Vol. 18, No. 5, pp. 666-670, (March 1979).

A microbend sensor suitable is described in N. Lagakos, J. H. Cole, and J. A. Bucaro, "Microbend fiber-optic sensor", Applied Optics, Vol. 26, No. 11, pp. 2171-2180, (June 1987). Other fiber optic sensors are described in Bucaro J. A., et al., "Fiber Optic Hydrophone", Journal of Acoustical Society of America, Vol. 62, pp. 1302-1304, 1977; Cole, J. H., et al., "Fiber Optic Detection of Sound", Journal of Acoustic Society of America, Vol. 62, pp. 1136-1138, 1977; and T. G. Giallorenzi, J. A. Bucaro, A. Dandridge, G. H. Sigel, J. H. Cole, S. C. Rashleigh and R. G. Priest, "Optical fiber sensor technology," IEEE Transactions on Microwave Theory and Techniques MTT-30, pp. 472-511, (1982).

BRIEF SUMMARY OF THE INVENTION

An aspect of the invention is directed to a hydrophone having a reflective diaphragm having an exposed face and a protected face, at least one transmitting multimode optical fiber having an end spaced apart from the protected face of the diaphragm positioned to emit light toward the diaphragm, a housing, with a cavity defined by the diaphragm and the interior surface of the housing, and a reservoir. A first port between the cavity and the reservoir and a second port between the reservoir and the exterior of the hydrophone allow static pressure communication between the cavity and the exterior of the hydrophone.

Both a compressible material disposed in the cavity and optically transmissive liquid disposed in the cavity. The optically transmissive liquid can be a silicone oil. The compressible material can be an elastomeric material having gas-filled cells. The gas can be air or another gas. The elastomeric material having gas-filled can be located out of the optical path between the optical fiber end and the diaphragm. The elastomeric material can be polyurethane with air-filled cells, having about 15% air by volume at room temperature and pressure, or between 10% and 20% air by volume at room temperature and pressure.

The hydrophone can have a protective grate or grid affixed to the housing and arranged external to the diaphragm. The hydrophone can include a plurality of multimode optical fibers surrounding the at least one transmitting optical fiber. The diaphragm can be positioned at an end of the hydrophone with the reservoir located at an opposite end of the hydrophone. Upon a change in pressure external to the hydrophone, the diaphragm is deflected axially, modulating the intensity of the light received by the receiving multimode fibers.

Another aspect of the invention is directed to a hydrophone for having a reflective diaphragm having an exposed face and a protected face, at least one transmitting multimode optical fiber having an end spaced apart from the protected face of the diaphragm positioned to emit light toward the diaphragm, a housing with a cavity defined by the diaphragm and the interior surface of the housing, the housing having a port configured to allow static pressure communication between the exterior of the hydrophone and the cavity, and a compressible material disposed within the cavity, wherein the material is not in the optical path between the transmitting optical fiber and the diaphragm, and an optically transmissive liquid disposed in the cavity.

The optically transmissive liquid can be a silicone oil. The compressible material can be an elastomeric material having gas-filled cells. The elastomeric material can be polyurethane, and the gas can be air. The elastomeric material can includes about 15% air by volume at room temperature and pressure. The elastomeric material can include between 10% and 20% air by volume at room temperature and pressure.

The hydrophone can also include a protective grate affixed to the housing and arranged external to the diaphragm. The fiber probe can also include a plurality of multimode optical fibers surrounding the at least one transmitting optical fiber.

BRIEF DESCRIPTION OF THE DRAWING FIGURES

FIGS. 1A, 1B, and 1C illustrate a fiber optic hydrophone in accordance with an embodiment of the invention.

FIG. 1D illustrates the fiber optic hydrophone of FIGS. 1A, 1B, and 1C in a system with an optical power source and a photodetector.

Figure 4A:
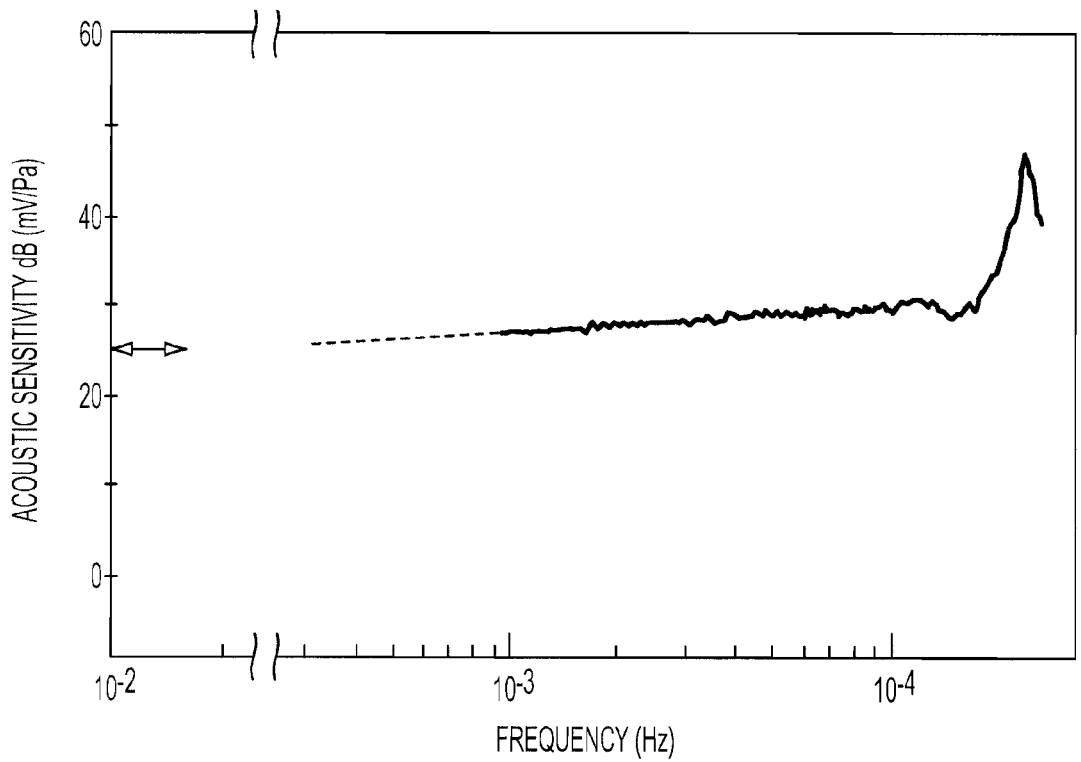

FIG. 4A plots the fiber optic sensor response measured over the entire band in Watts/Pa.

Figure 4B:
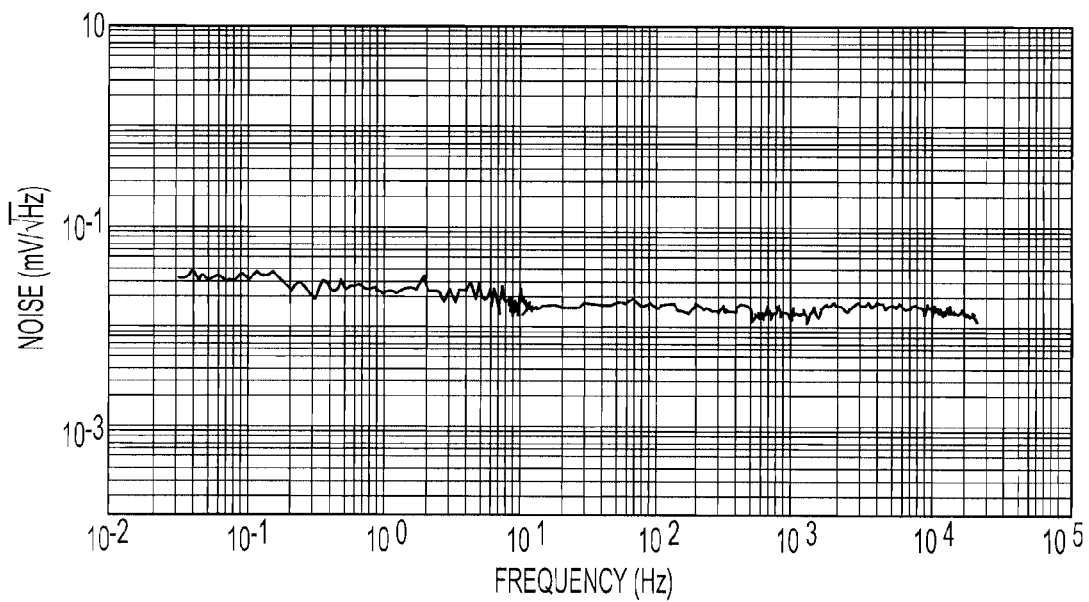

FIG. 4B shows the intrinsic noise level of the sensor in a quiet room with ambient acoustic levels of less than 100 microPascals.

FIG. 5A-5L illustrate a micromachining process for forming a thin silicon diaphragm for use as components in the exemplary hydrophones described herein.

FIG. 6A-6H illustrate a method for forming a hydrophone housing and affixing the diaphragm to the housing.

FIG. 7A-7B show an example of a multiplexed system of fiber optic hydrophones.

Figure 8:
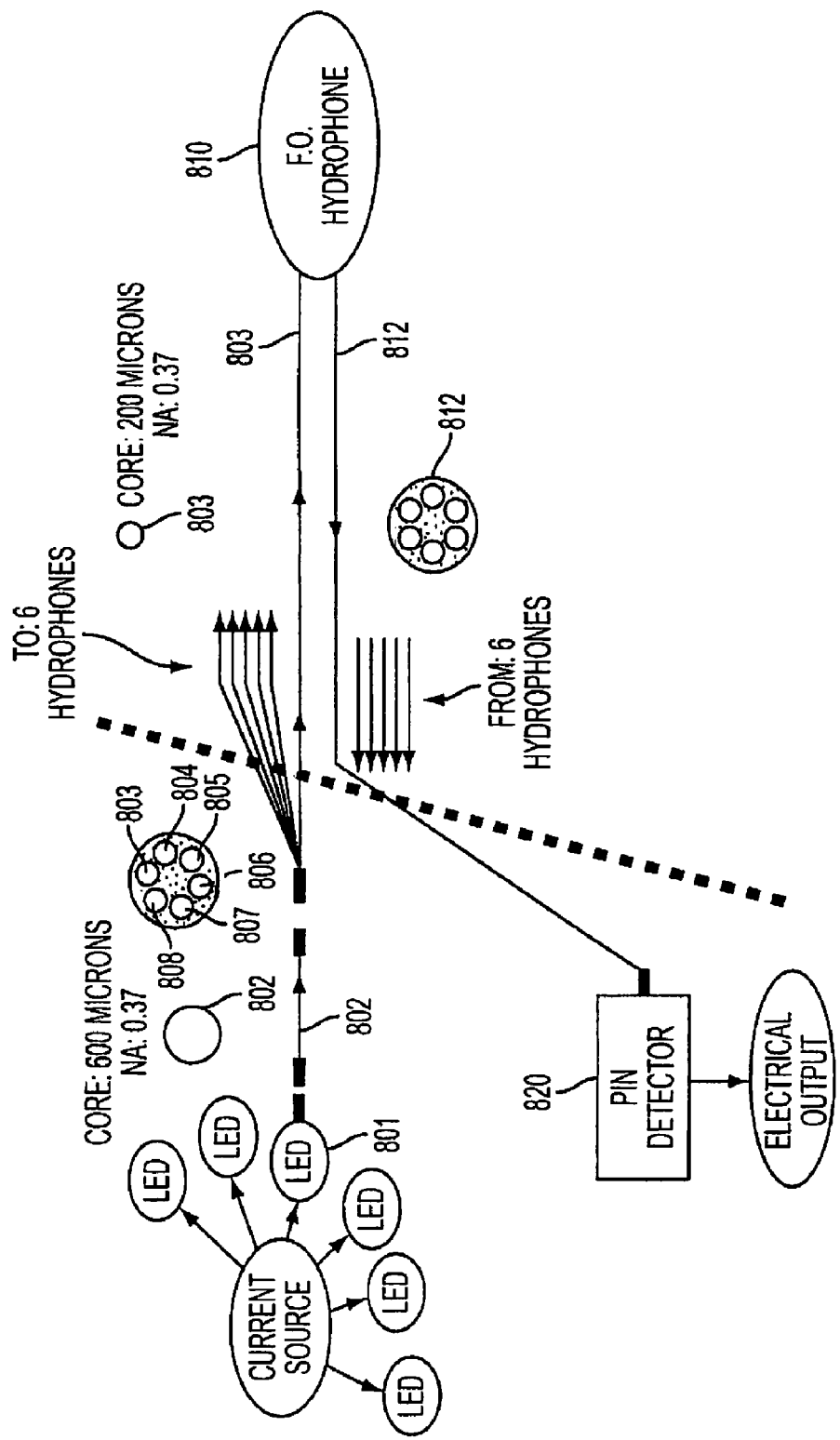

FIG. 8 illustrates another example of a multiplexed system of fiber optic hydrophones.

DETAILED DESCRIPTION OF EMBODIMENTS OF THE INVENTION

FIG. 1A shows a fiber-optic hydrophone in accordance with an embodiment of the invention. The hydrophone 100 is capable of operation over a wide range of depths.

In this embodiment, the fiber optic hydrophone 100 includes a housing 110. The housing 110 has a first end 112 and a second end 115. The housing 110 can be a metal cylinder, for example, stainless steel. Other housing materials may also be suitable, for example, plastic or ceramic.

The hydrophone also includes a fiber optic probe 120 shown in more detail in FIGS. 1B and 1C. The fiber optic probe 120 includes a centrally arranged multimode optical fiber 121 for transmitting light, and a plurality of multimode receiving fibers for receiving reflected light. In this example, the fiber optic probe 120 includes one transmitting fiber 121 and six receiving fibers 122, 123, 124, 125, 126, 127. The probe can include a sleeve 128, which can be plastic, stainless steel, ceramic, glass, or another material.

As will be discussed in later paragraphs, is noted that other arrangements are also suitable. For example, the fiber optic probe can include only one transmitting multimode optical fiber and only one multimode receiving optical fiber, or can include only single multimode optical fiber for both transmitting and receiving reflected light.

The polished end 129 of the fiber optic probe is located very close to the diaphragm 131. The diaphragm can be formed of silicon, and coated with gold or another reflective metallic thin film, with the reflective face of the diaphragm facing toward the fiber probe.

A portion of the cavity is filled with a compliant material that compresses under pressure. The compliant material can be a rubber or elastomer 132, such as for example, a polyurethane having entrained air bubbles or cells. In order to prevent blockage of the emitted or reflected light along the optical paths between the fiber probe and the diaphragm, the compliant material should be held out of the gap between the optical fiber probe and the diaphragm.

An optically transmissive liquid 133 fills the remainder of the cavity 134 between the elastomer-coated fiber probe, the housing 110, and the diaphragm 131. One suitable liquid is silicone oil.

The hydrophone sensor also includes a reservoir 114, which is separated by a wall 117 from the cavity 134. A small passageway or port 116 is positioned in the wall 117 between the reservoir 114 and the cavity 134, allowing the silicone oil inside sensor cavity or reservoir to pass through the port between the sensor cavity and the sensor reservoir. A small opening or port in the housing allows the exterior liquid (e.g., seawater) to enter the reservoir, allowing the static pressure of the exterior to be communicated to the reservoir. The static pressure in the reservoir is in turn communicated to the fluid in the cavity 134 by the port 116. A membrane 135 can be located in the reservoir 114 to contain the silicone oil and prevent the exterior liquid (e.g., seawater) from entering the cavity 134 or mixing with the silicone oil. The membrane 135 is thin and flexible enough to allow the static pressure of the liquid on the exterior of the membrane to be transmitted to the silicone oil on the opposite side of the membrane.

The cavity and reservoir form a compensating system that equalizes the static pressure inside the housing with the outside static pressure, and allows the silicone oil to move between the cavity and the reservoir as the volume of the cavity changes in response to static and dynamic pressure changes. The reservoir, the membrane, and the silicone oil minimize the chance of seawater or contaminant intrusion into the gap between the fiber probe and the diaphragm.

The sensor can also include a grating or grid 113, located at the diaphragm end of the sensor, for protecting the diaphragm 131 from environmental damage. The open portion of the grating or grid 113 should be much larger than the size of the static pressure ports 116 and 118, and should be large enough to allow dynamic pressure changes in the external environment to readily displace the diaphragm. The polyurethane with air bubbles also expands or contracts based on the static pressure within the hydrophone cavity.

Silicone oil is a polymerized siloxane available under various brand names, such as, for example, Dow Corning 200. Other liquids that are optically transmissive are also suitable.

Light is transmitted through the multimode transmitting fiber of the fiber probe and is incident on the diaphragm, which reflects a portion of the optical energy toward the fiber probe end. A portion of the reflected energy is received in the receiving multimode optical fibers.

A pressure change external to the hydrophone deforms the diaphragm, so the center of the diaphragm is displaced either toward the end of the fiber optic probe or away from the end of the fiber optic probe. The change in the distance between the end of the fiber optic probe and the diaphragm changes the amount of light received in the receiving optical fibers. The gap distance, and thus, the external pressure, can be determined by the intensity of the light transmitted from the receiving optical fibers to the photodetectors. The photodetector produces an electrical voltage with an amplitude that corresponds to the intensity of the light detected by the photodetector. Changes in amplitude of the electrical signal indicate changes in pressure at the sensor.

Figure 2:
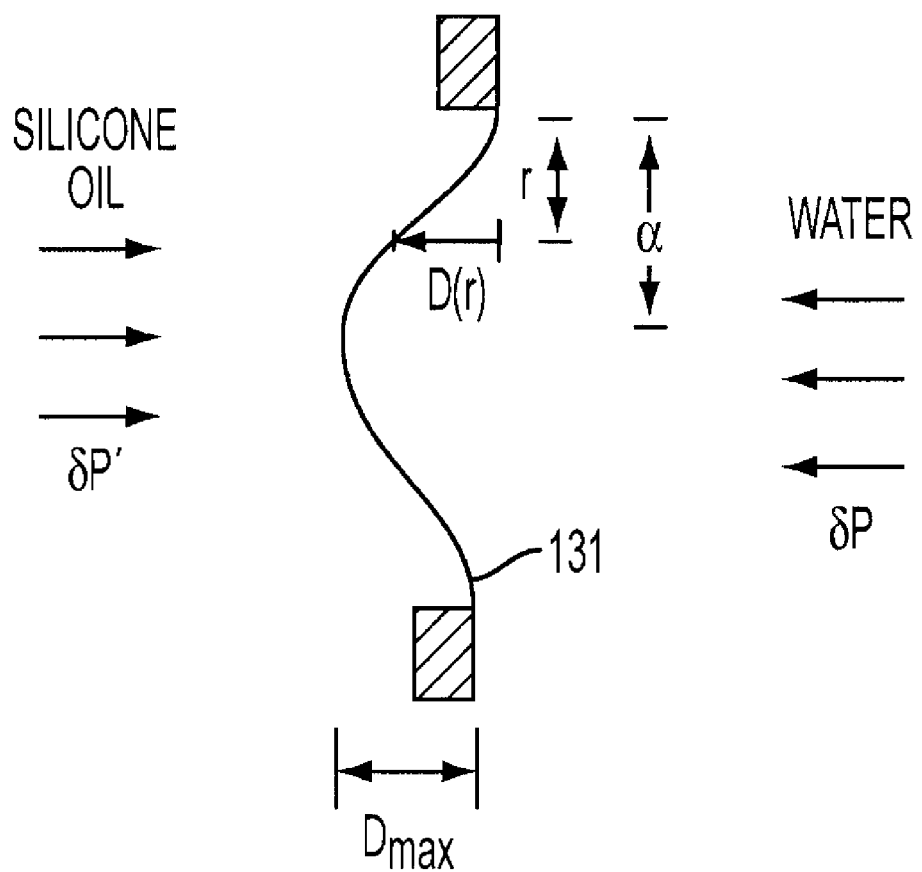
FIG. 2 illustrates deflection of the diaphragm in the hydrophone of FIGS. 1A, 1B, and 1C or FIGS. 3A and 3B in operation.

FIG. 2 illustrates the operation of the diaphragm. An external pressure $\delta p$ generates pressure $p_o$ on the diaphragm and pressure $\delta p'$ on the fluid inside the hydrophone, such that $$\delta p = p_o + \delta p'. \quad (1)$$

The diaphragm deformation D due to pressure $p_o$ can be expressed as:

$$D = D(r) = C(1 - r^2/a^2)^2 \quad (2)$$

where $$C = p_o/[A(64/a^4] \quad (3)$$

and $$A = Eh^3/[12(1-v^2)]. \quad (4)$$

The diaphragm can be modeled as a thin, clamped plate. In the equations above, E is Young's modulus and v is Poisson's ratio of the fluid inside the hydrophone, and h and a are the diaphragm thickness and radius, respectively. Equations (2)-(4) illustrate the strong dependence of the diaphragm displacement D on the thickness h and radius a.

The volume change $\Delta V$ due to diaphragm deformation and caused by the external pressure $p_o$ can be calculated in terms of the maximum displacement $D_{max}$ of the diaphragm to be:

$$\Delta V = (1/3)(\pi a^2) D_{max} \quad (5)$$

The maximum displacement $D_{max}$ will occur at the center of the diaphragm. The fiber probe is aligned with the center of the diaphragm, so the probe will detect the maximum displacement of the diaphragm.

The volume displacement $\Delta V$ causes both a displacement $\Delta V_1$ of volume of the fluid in the cavity and a volume displacement of $\Delta V_2$ the air-bubble embedded polyurethane, which can be written as:

$$\Delta V = \Delta V_1 + \Delta V_2 = [(V_1/K_f) + (V_2/K_p)] \delta p' \quad (6)$$

where $K_f$ is the bulk modulus of the fluid in the cavity and $K_p$ is the bulk modulus of the polyurethane.

Equation (5) and (6) can be combined and written as:

$$(1/3)(\pi a^2) D_{max} = [fV/K_f) + ((1-f)V/K_p)] \delta p' = F_o \delta p' \quad (7)$$

where f is the volume fraction of the fluid in the hydrophone and $F_o$ is defined to be equal to $fV/K_f) + ((1-f)V/K_p)$.

Assuming, as an example, an applied pressure $\delta p$ of 1 Pa, then the maximum displacement $D_{max}$ will be $$D_{max} = 1/[A(64/a^4) + (1/3)(\pi a^2)/F_o]. \quad (8)$$

It can be seen that the maximum displacement has two components. The first component is dominated by the diaphragm radius a and thickness h and the second component is dominated by the fluid and polyurethane characteristics $K_f$ and $K_p$.

For higher sensitivity, the maximum displacement should be as large as possible, which requires the denominator in equation (8) to be small. Thus, the combination of a compliant diaphragm and the compensated fluid-polyurethane-air-bubbles system can provide a very high pressure sensitivity. Larger diameter, thinner diaphragms will be more compliant than smaller diameter, thicker diaphragms.

The combination of the silicon oil filled cavity and the air-embedded polyurethane is very compliant, and is more compliant than silicone oil would be without the polyurethane.

The bulk modulus of the elastomer-air ("rubber"-air) or composite is determined by the bulk and shear moduli of the elastomer matrix and the volume fraction of air added. The expression for the bulk modulus of rubber is found in R. Corsaro and L. H. Sperling, "Sound and Vibration Dampling with Polymers", ACS Symposium Series, American Chemical Society, Washington, D.C., 1990. Polyurethane elastomers with more embedded air will be more compliant than those with less embedded air. These elastomers are more compliant than any fluid, as the air bubbles significantly lower the bulk modulus of the polyurethane.

Polyurethane rubbers are a good candidate for this elastomeric matrix because there is a range of urethane structures that offer a range of values of bulk and shear moduli and loss factor.

It is noted that a very high air content polyurethane elastomer can generate a static pressure problem at high external static pressures (e.g., at very deep depths of seawater). For example, if the depth is very great and the air content is too high, the elastomer may be compressed to a point where dynamic changes in the external pressure due to acoustic or seismic events would cause only a small change in volume of the elastomer, reducing the sensor's sensitivity. Accordingly, it may be suitable to include an elastomer with a lower air content elastomer for high pressure applications.

In addition, as the pressure sensitivity increases, the sensor's bandwidth decreases. The sensor can be designed for various applications based on a required sensitivity, bandwidth, and the expected static pressure.

A hydrophone having a polyurethane elastomer with 15% air bubbles is sensitive over a wide range of depths. At a depth of 400 feet of seawater, the sensitivity decreases by only 0.1 dB from the sensitivity at the water surface (1 bar).

Shallow Water Hydrophone

Figure 3A:
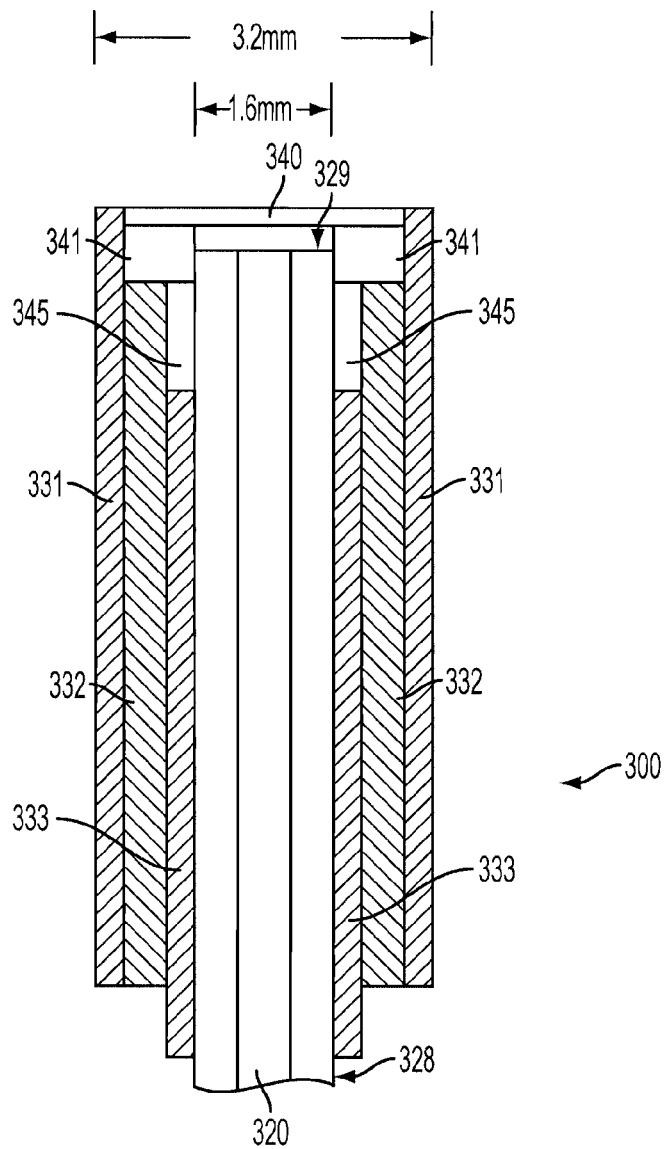
FIGS. 3A and 3B illustrate a fiber optic hydrophone in accordance with an embodiment of the invention, suitable for use in air or at shallow depths.
Figure 3B:
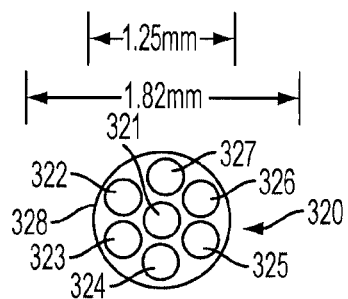

FIGS. 3A and 3B illustrate a hydrophone 300 suitable for use in shallow depth/low pressure environments.

In this embodiment, the fiber optic hydrophone sensor 300 includes a housing 310 having a first end 312 and a second end 114. The housing 110 can be metal cylinder, for example, stainless steel.

A fiber optic probe 320 includes a centrally arranged multimode optical fiber 321 for transmitting light into the sensor, and a plurality of multimode receiving fibers for receiving reflected light. As shown in FIG. 3B, in this example, the fiber optic probe 320 includes one transmitting fiber 321 and six receiving fibers 322, 323, 324, 325, 326, 327. The probe can include a sleeve 328, which can be plastic, stainless steel, ceramic, glass, or another material.

The housing can include one or more cylindrical tubes. For example, FIG. 3A illustrates an outer R-HTX-10TW stainless steel tube 331 (inner diameter 0.114 inches, outer diameter 0.134 inches), and inner R-HTX-12TW stainless steel tube 332 (inner diameter 0.077 inches, outer diameter 0.109 inches). A third stainless steel tube 333 (R-HTX-15, inner diameter 0.054 inches, outer diameter 0.072 inches) surrounds a length of the fiber probe 320.

A silicon diaphragm 340 is located at the free end of the sensor. The diaphragm 340 and supporting structure 341 are formed by a micromachining process, and are then affixed to the housing 330. The fiber probe is inserted into the housing until the polished end 329 of the fiber probe 320 is positioned optimally with respect to the diaphragm 340, as discussed in later paragraphs. The opposite end of the fiber probe is affixed to the housing with an adhesive.

A cavity 345 is formed between the diaphragm 340, the interior surface of the housing tube 332, the fiber probe 320, and the end face of the tube 333. Preferably, the cavity contains air or another gas, and is sealed against the exterior by the adhesives that affix the diaphragm support frame and the adhesives that affix the fiber probe to the housing.

The very compliant air in the cavity allows the diaphragm to be displaced by external pressure changes. The pressure sensitivity is controlled only by the stiffness of the silicon diaphragm, which depends on the diaphragm's thickness and diameter. Because the volume of air can be very small, the sensor can be made very compact without loss of pressure sensitivity.

In operation, light is transmitted through the multimode transmitting fiber of the fiber probe and is incident on the diaphragm, which reflects a portion of the optical energy toward the fiber probe end. A portion of the reflected energy is received in the receiving multimode optical fibers.

A pressure change external to the hydrophone deforms the diaphragm, so the center of the diaphragm is displaced either toward the end of the fiber optic probe or away from the end of the fiber optic probe. The change in the distance between the end of the fiber optic probe and the diaphragm changes the amount of light received in the receiving optical fibers. The gap distance, and thus, the external pressure, can be determined by the intensity of the light transmitted from the receiving optical fibers to the photodetectors.

The hydrophone sensor shown in FIG. 3 has been tested for pressure sensitivity in air. A dynamic pressure calibrator is used to determine the dynamic broadband response of the fiber optic sensor over the low frequency range. A standard open-air, speaker technique is used to determine the dynamic broadband response of the fiber optic sensor over the high frequency range.

A pseudo-static response is the change in optical signal that results from small step changes in pressure, measured over an approximately 100 second period. The pseudo-static response of the sensor was determined by attaching the sensor diaphragm end to one end of 6.4 mm inner diameter U-shaped plastic tubing, and varying the water height.

The low frequency measurements were made over the band 30 Hz to 1000 Hz by placing the sensor in a Bruel and Kjer (B&K) type 4221 pressure calibrator, together with a standard calibration microphone (a B&K 4938 sensor with a 2669 B&K preamplifier and a 2690 B&K amplifier). A broadband chirp pulse covering the band was applied to the calibrator, and the output signals from the fiber optic sensor and the calibration microphone were recorded and stored in a Macintosh computer using a ML 750/M Power Lab recorder.

A free-field configuration was used to measure the higher frequency response in the 900 Hz to 25 kHz range. A high-fidelity loudspeaker was mounted on a pedestal with the fiber optic sensor mounted to a vertical supporting rod. Both the source and the sensor were positioned so that the nearest reflecting surfaces in the room were at least 1.5 meters away. The loudspeaker was driven with a gated sinusoidal signal whose duration was sufficiently short to ensure that the direct sound signal from the speaker to the sensor and echoes from surrounding reflecting surfaces could be separated in time. The fiber optic sensor was removed after recording the response signals and replaced by the B&K calibration at the same location, in order to determine the absolute pressure levels required to calibrate the fiber optic sensor response.

FIG. 4A shows the fiber optic sensor response measured over the entire band in Watts/Pa. The response in Watts/Pa can be converted to units of amps/Pa by multiplying the Watts/Pa value by the photo-detector sensitivity D.

FIG. 4B shows the intrinsic noise level of the sensor in a quiet room with ambient acoustic levels of less than 100 microPascals. The intrinsic noise level is plotted in units of optical power/$(Hz)^{1/2}$, which could also be converted to volts/$(Hz)^{1/2}$ by multiplying by 1.1 volts/Watt. As seen in FIG. 4B, the noise of the sensor increases by very little at very low frequencies, indicating that it is very suitable for low frequency pressure measurement. The minimum detectable pressure can be determined at any frequency using the values in FIGS. 4A and 4B. For example, at one kHz, the minimum detectable pressure is 680 microPascals/$(Hz)^{1/2}$.

The length of the shallow water hydrophone sensor 300 is approximately 16 mm, with a diameter of about 3.2 mm.

Note that the sensor of FIG. 3 is small and compact, is useful over a wide range of frequencies, however, it is limited to use in relatively low pressure applications. For example, the sensor is useful in air or at shallow water depths. Because the air cavity within the sensor is sealed, very high pressures can deform or break the diaphragm.

For both the shallow water hydrophone of FIG. 3 and the deep water hydrophone of FIG. 1, it is also suitable to replace the seven-fiber optical fiber probe with a different fiber optic probe. For example, the fiber optic probe can include only one transmitting multimode optical fiber and only one multimode receiving optical fiber, or can include only single multimode optical fiber for both transmitting and receiving reflected light.

As discussed in previous paragraphs, the diaphragm is an important component of the hydrophone system. The diaphragm reflects the light that is emitted by the transmitting fiber, a portion of which is received into the receiving fibers. The diaphragm is deflected when an external pressure is applied to the hydrophone, and the deflection of the diaphragm modulates the light power received by the receiving fibers. The diaphragm can be a thin elastomer or a thin silicon film. A thin silicon diaphragm can be made by the micromachining process illustrated in FIG. 5A-5L and as described below. The silicon thickness and diameter control the pressure sensitivity of the hydrophone, and can be optimized with high accuracy and repeatability.

Figure 5A:
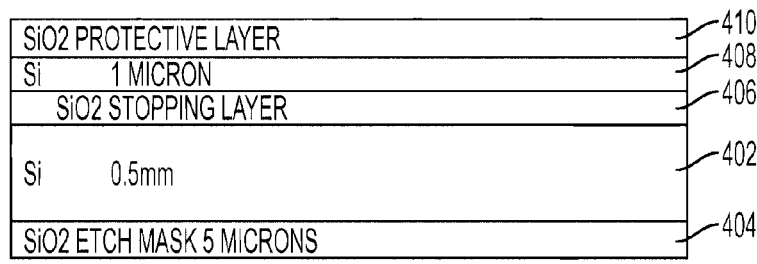

FIG. 5A is a cross sectional view of a portion of a silicon-on-insulator wafer between approximately four inches and six inches in diameter.

The silicon-on-insulator (SOI) wafer is formed of a layer 402 of single crystalline silicon. On the front face of the silicon layer 402 is a silicon (silicon dioxide, $SiO_2$) stopping layer 406 approximately 1 micron thick and a thin layer of silicon 408 approximately 1.5 microns thick. The thin layer of silicon 408 will form the diaphragm of the sensor, and the thick substrate layer of silicon 402 will form the cylindrical support element for the diaphragm. The silica stopping layer 406 is also known as a buffered oxide (BOX) layer. The stopping layer 406 is a material that resists deep reactive ion etching, but is etched by the hydrofluoric acid wet etch.

The thickness of the thick silicon layer 402 is selected to be the desired final thickness of the support element. In this example, the thick silicon layer 402 is approximately 500 microns (0.5 mm) thick, although it can be thicker or thinner. Thicker support elements are preferable, in order to provide more support to the diaphragm.

The thick silicon layer 402 should be of a uniform thickness across a region that will include the support element for a diaphragm, in order to minimize stress in the diaphragm.

A protective layer of silica 410 approximately 1 micron thick is applied to the thin silicon layer 408, preferably by a plasma-enhanced chemical vapor deposition (PECVD) technique. A silica etch mask layer 404 is applied to the back face of the thick silicon substrate layer 402, preferably with the PECVD technique. The etch mask layer 404 is approximately 4-5 microns thick.

Figure 5B:
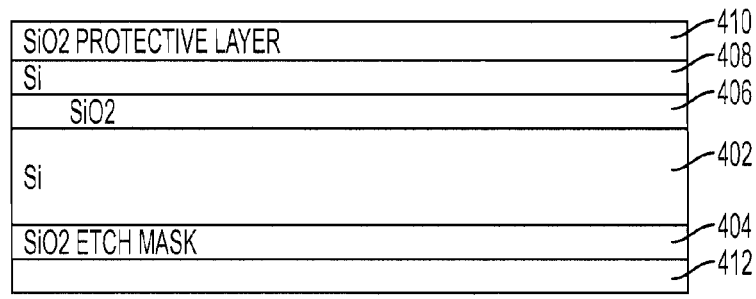

As shown in FIG. 5B, a photoresist polymer layer 412 approximately 5 microns thick is applied to the silica etch mask layer 404.

Figure 5C:
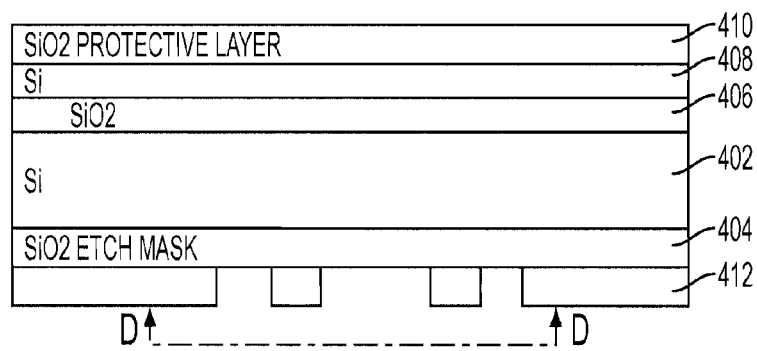
Figure 5D:
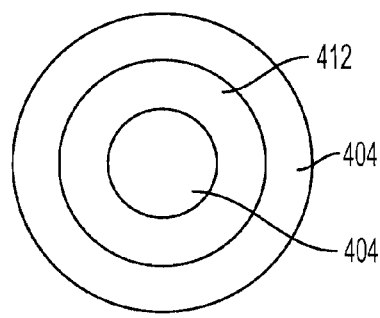

As shown in FIGS. 5C and 5D, the photoresist layer 412 is patterned using contact optical lithography. This lithography step forms circular openings in the back-side silica layer 404 to allow exposure of the silicon wafer 402 to a deep reactive ion etch (DRIE). The openings have a diameter of that corresponds to the outer diameter of the optical fiber bundle, which in this example is approximately 1.6 mm. The remaining oxide film in the silica etch mask layer 404 forms a high resistance mask which protects those parts of the wafer that are intended to form the frame of the diaphragm.

Figure 5E:
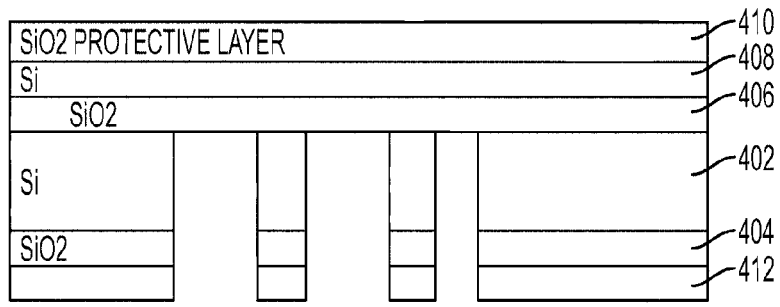

FIG. 5E illustrates a deep reactive ion etching of the silica etch mask layer 404 and the 500 micron silicon layer 402 to form circular openings in the silicon layer 402. The deep reactive ion etch is preferably a Bosch process featuring a high etch rate, very high anisotropy, and high sensitivity, where sensitivity is the ratio of the Si etch rate to the silica etch rate. This ion etch process etches cylindrical channels originating at the back side oxide layer 404, penetrates through the entire silicon wafer thickness, and stops at the bottom of the silica stopping layer 406. The DRIE will etch away a circular portion of the silicon layer 402, exposing a circular area in the stopping layer 406. The diameter of the exposed circular portion of the stopping layer 406 should match the desired diameter of the finished diaphragm. The channels can have nearly vertical walls, although the walls can also have an irregular profile.

The thin silicon layer 408, which is sandwiched between the silica stopping layer 406 and the silica protective layer 410, will form a diaphragm supported by the silicon cylindrical support element 414.

Figure 5F:
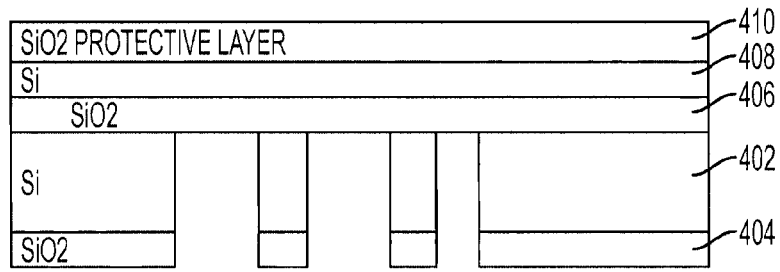
Figure 5G:
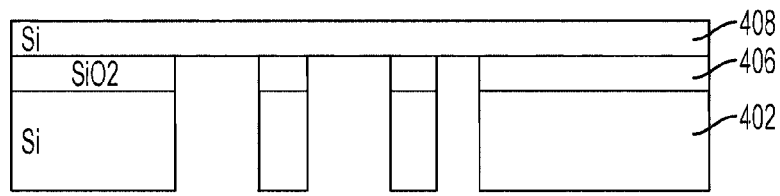

FIG. 5F illustrates the wafer after the photoresist layer 412 has been removed by cleaning the wafer with acetone. A short wet etch in hydrofluoric acid (HF) dissolves the exposed portion of the silica stopping layer 406 and the silica protective layer 410, exposing a relatively low stress single crystal diaphragm with a circular shape, as seen in FIG. 5G.

Figure 5H:
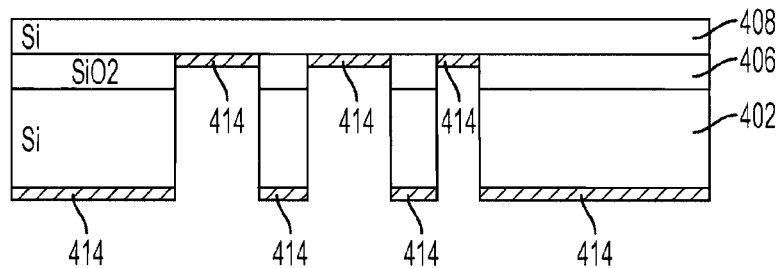

A reflective coating 414, such as aluminum or gold, can be evaporated onto the surface of the wafer after the diaphragm is exposed. As shown in FIG. 5H, the reflective coating can be evaporated onto the entire surface of the wafer so it coats both the exposed silicon diaphragm and the silica un-etched portions of the wafer.

Figure 5I:
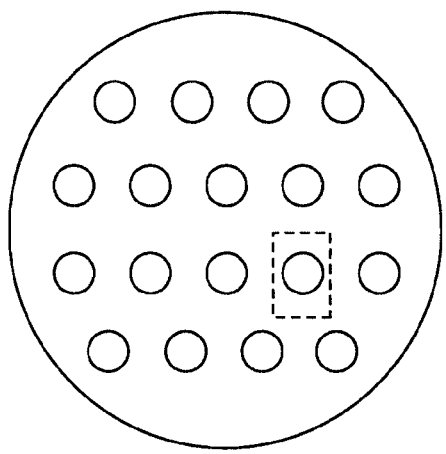

Note that the steps shown in FIG. 5A-5H are accomplished to produce a number of thin diaphragm regions on the wafer. FIG. 5I show a wafer with a number diaphragms resulting from these steps. Note that although only a few diaphragms are shown in this figure for clarity, however, hundreds of diaphragms or more can be formed of the same wafer. The diaphragms can be separated from each other by as little as one or two millimeters.

Figure 5J:
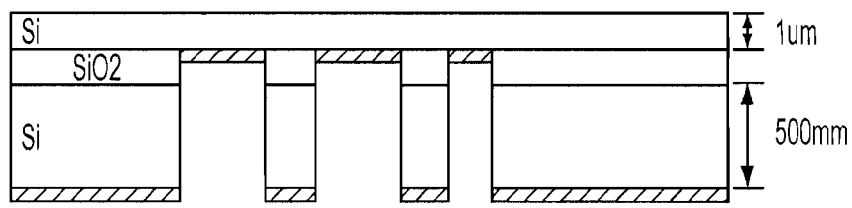
Figure 5K:
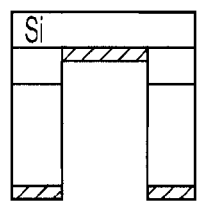
Figure 5L:
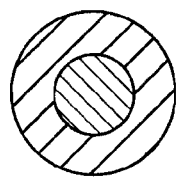

FIG. 5J shows the side view of a single diaphragm and support element formed by this process. FIGS. 5K and 5L show the integral diaphragm and support element after it has been broken away from the remaining portion of the wafer. The result is a circular silicon diaphragm supported at its outer edge by a cylindrical frame formed of the un-etched 500 micron thick silicon wafer material. In subsequent steps, the diaphragm regions are individually broken away from the wafer and affixed to the housings to form individual sensors.

FIG. 6A-6H illustrate a method for forming the fiber optic pressure sensor using the etched and coated wafer of FIG. 5L according to an exemplary embodiment of the invention. This example illustrates the steps for forming a sensor with seven fibers, including one transmitting multimode fiber and six surrounding receiving multimode fibers.

The fiber optic pressure sensor includes a housing which includes one, two, or three cylindrical tubes. In the example shown in FIG. 6A-6H, three stainless steel tubes form the housing. The inside diameter of the smallest tube should be slightly larger than the outer diameter of the fiber or fiber bundle which will be enclosed within the housing.

Figure 6B:
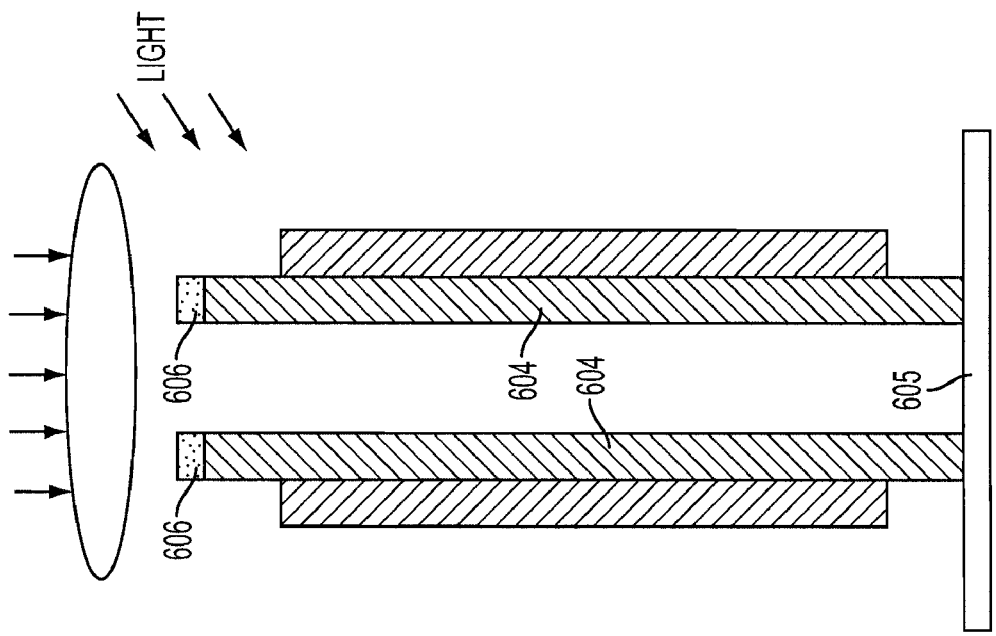
Figure 6A:
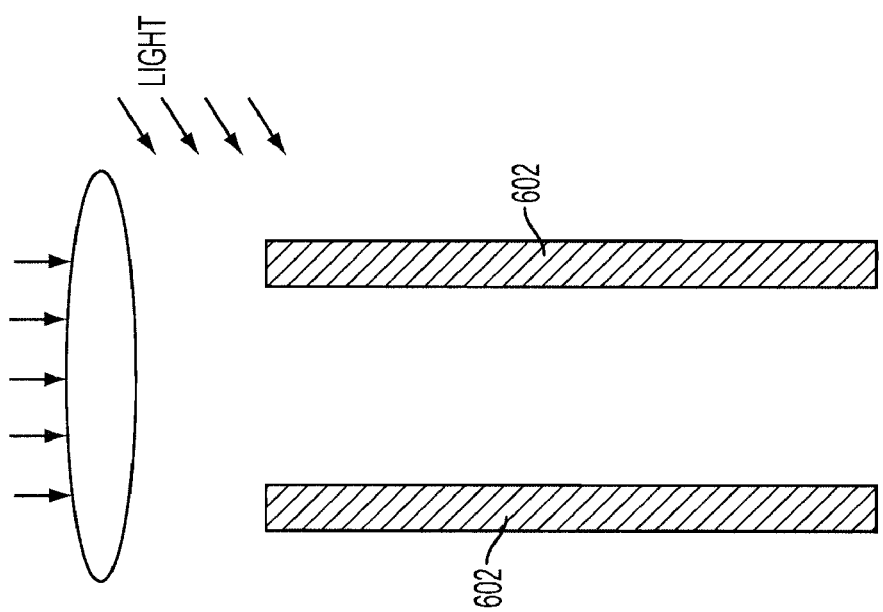

As shown in FIGS. 6A and 6B, a stainless steel tube 602 is mounted in a three-axis xyz controlled fixture that is movable in three directions. A microscope is focused on the upper edge of the tube 602. A second, smaller stainless steel tube 604 is gripped by another xyz controlled fixture. A uniform layer of epoxy is applied to the upper end of the tube 604. A uniform epoxy layer will prevent strain in the diaphragm, while an irregular epoxy layer can cause unacceptable strains in the diaphragm.

The smaller tube 604 is inserted into the larger tube 602, and transparent stopper 605 is held in place by another xyz controlled fixture below the smaller tube 604 so the smaller tube 604 does not drop through the larger tube 602.

Figure 6E:
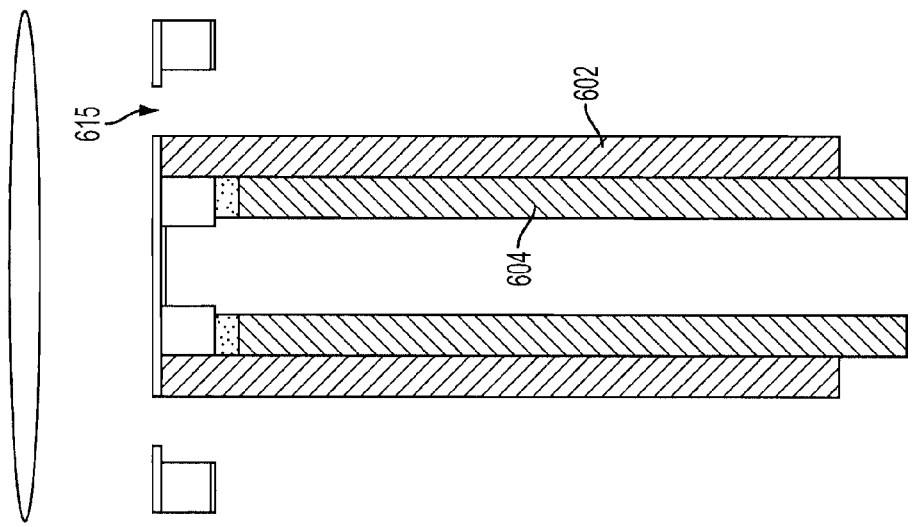
Figure 6F:
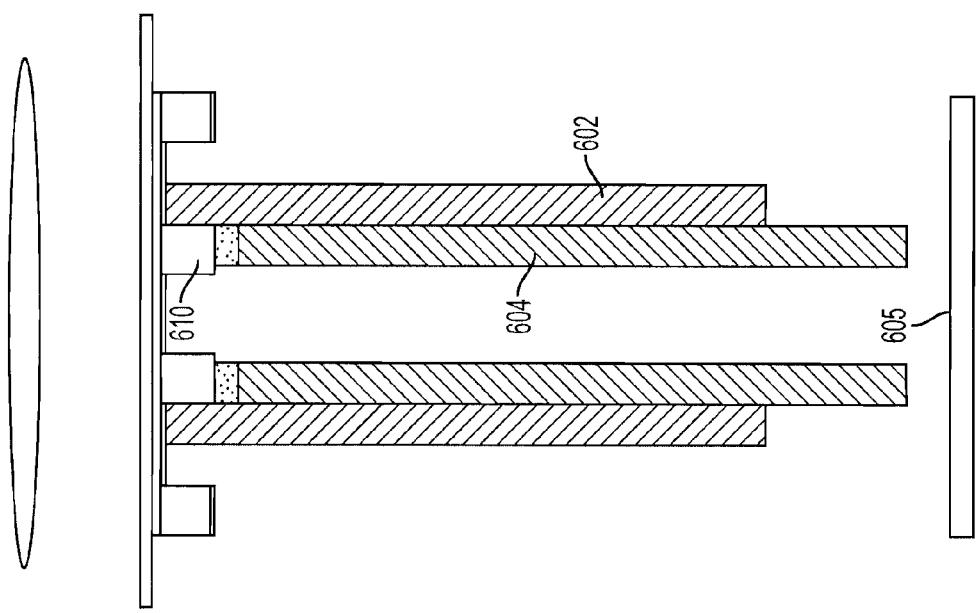

For steps shown in FIG. 6C-6E, the microscope is located above the upper end of the stainless steel tubes and a light source is positioned at the opposite end of the stainless steel tubes. With the edges of the silicon wafer 608 being supported on a movable microscope platform that can move in the x, y, and z directions, the silicon wafer is brought into position between the microscope lens 613 and the upper end of the tubes, and aligned so the wafer's cylindrical support element 610 is immediately above the epoxied end of the inner stainless steel tube 604, as seen in FIG. 6C.

A microscope slide 612 is brought into position above the silicon wafer 608, as shown in FIG. 6D. The microscope slide 612 holds the wafer in place while the tubes 604 and 602 are positioned against the wafer. The transparent stopper 605 is moved upward, pushing the smaller tube 604 upward until the uniformly epoxied end of the tube 604 contacts the cylindrical support element 610 of the wafer. It is important that the epoxy does not contact the diaphragm area, as epoxy would change the mechanical properties of the diaphragm.

As seen in FIG. 6E, the outer stainless steel tube 602 is then moved upward until its end face contacts the silicon wafer 612 in the etched region radially outside the cylindrical support element 610. The microscope slide 612 allows the outer tube 602 to contact the etched channel in the wafer without introducing additional strain into the diaphragm. The outer tube 602 is epoxied to the inner tube 604 at the end of the tubes away from the wafer. After the epoxy has cured, the wafer is broken in a circle in the etched channel area of the wafer immediately outside of the tube 602.

Optionally, a third stainless steel tube 614 is then inserted inside the second tube 604. The inner diameter of the tube 614 is slightly larger than the outer diameter of the fiber probe which will subsequently be fit into the tube 614. The end of the third tube 614 can be set back somewhat from the end of the second tube 604, as shown in FIG. 6G. The stainless steel tube 614 is epoxied into place.

In this example, the outer stainless steel tube 602 is R-HTX-10TW tubing with an inner diameter of 0.114 inches and an outer diameter of 0.134 inches. The middle tube 604 is R-HTX-12TW with an inner diameter of 0.077 inches and an outer diameter of 0.109 inches. The third, inner tube 614 is R-HTX-15TW, with an inner diameter of 0.054 inches and outer diameter of 0.072 inches.

Figure 6H:
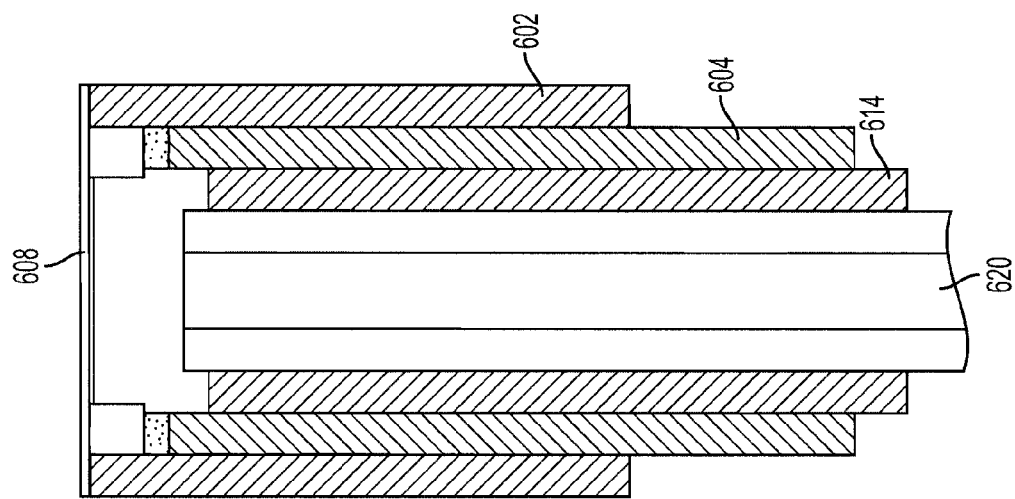
Figure 6G:
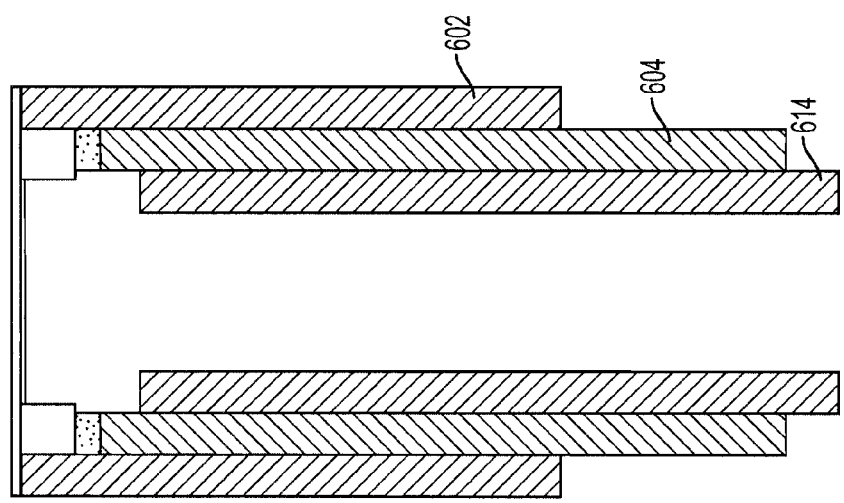

As illustrated in FIG. 6H, the fiber optic probe 620 is inserted into the innermost tube 614. If desired, or if needed to reduce the size of the optical fiber probe, any optical fiber coating can be stripped from the fiber clad before inserting the fibers into the tubes.

While the fiber optic probe 620 is inserted into the housing, light is transmitted through the transmitting fiber and the amount of light reflected by the diaphragm into the receiving fiber is monitored. When the amount of reflected light reaches a predetermined level, the fiber optic probe 620 and the third tube 614 are epoxied into place. Details for determining a predetermined amount of light corresponding to an optimum sensitivity and bandwidth are described in U.S. Pat. No. 7,697,798 to Lagakos et al., incorporated herein by reference in its entirety.

Note that while FIGS. 6G and 6H illustrate an embodiment in which three stainless steel tubes form the housing, embodiments of the invention can also include only two tubes 602 and 604, or only one tube 604. The inner diameter of the innermost tube should be slightly larger than the outer diameter of the fiber probe.

The remaining portion of the wafer has additional etched regions which can be used for forming other fiber optic sensor. After the wafer is broken, the steps in FIG. 6A-6H above can repeated for other diaphragm/frame sections of the wafer.

EXAMPLES

In one example of a fiber optic hydrophone of FIG. 1, the silicon diaphragm has a 1.6 mm diameter (radius a of 0.8 mm) and a 1.5 micron thickness. Silicon has a Young's modulus of is $1.9 \times 10^{11}$ Pa and a Poisson's ratio of 0.18. The fluid inside the sensor cavity is silicone oil. The elastomer is polyurethane with 15% air bubbles by volume. The elastomer fills 90% of the interior cavity volume, and the remaining 10% is filled with the silicone oil. The bulk modulus of the polyurethane resin with 15% air bubbles is calculated to be approximately $10^8$ Pa, which is approximately 10 times lower than that of silicone oil. The hydrophone housing is a metal tube three centimeters in length and one centimeter in radius.

The length of the hydrophone determines the maximum frequency of the sensor. When the length L is less than or equal to the wavelength of sound in the surrounding water, the incident acoustic pressure is applied uniformly to the hydrophone, and the response of the hydrophone is quasi-static with a flat frequency dependence.

The maximum diaphragm displacement generated by an applied pressure of 1 Pa can be calculated to be $D_{max}=8\times10^{-8}$ m. The minimum detectable displacement of the seven-fiber probe has been found experimentally to be $D_{min}=1\times10^{-11}$ m. The minimum detectable pressure for the fiber optic hydrophone can be found to be 42 dB re 1 $\mu Pa/(Hz)^{1/2}$. This is a very small detectable pressure, and is comparable to the H56, one of the best commercially available PZT hydrophones.

A theoretical basis and experimental results of intensity modulation for one-fiber, two-fiber, and seven-fiber fiber optic sensors with pressure-deflected diaphragms is discussed in U.S. Pat. No. 7,697,798, the disclosure of which is incorporated herein in its entirety.

Multiplexing

FIG. 7A illustrates a multiplexed system with three fiber optic hydrophones 702, 704, and 706. In this example, the three hydrophones are of the type shown in FIG. 1A-FIG. 1C, and are located at different locations. FIG. 7B is a cross-sectional view of the hydrophone 706. A bundled fiber optic cable with the six receiving fibers of the hydrophone 706 transmits the received light from the hydrophone to the photodetector 720. A single larger diameter optical fiber 714 (core diameter of 400 microns) couples the LED light from the larger diameter fiber 714 into the several smaller diameter core multimode fibers 724, 726, 728 in the manner disclosed in U.S. Pat. No. 7,379,630 to Lagakos et al., the disclosure of which is incorporated herein in its entirety. In this example, this multiplexing arrangement allows one current source 722 to support six LEDs, and each LED 716 to supply light to three optical fibers 724, 726, 728, so each LED can supply light to three hydrophones 702, 704, 706.

FIG. 8 illustrates a system in which each LED supplies light to six multimode optical fibers 802, 804, 805, 806, 807, and 808, and each of these multimode optical fibers supplies light to a hydrophone. The larger diameter multimode fiber 802 has a core diameter of 600 microns, and is optically connected to the six 200 micron diameter fibers in the manner disclosed in U.S. Pat. No. 7,379,630 to Lagakos et al. In this manner, each LED 801 can optically support thirty six hydrophones. A bundled fiber optic cable 812 with the six receiving fibers of the photodetector 810 transmits the received light from a hydrophone 810 to the photodetector 820.

By deploying the hydrophones at different locations, it is possible to differentiate between different acoustic sources and to determine a location of an acoustic source. It is also suitable to deploy a number of hydrophones that are sensitive to different frequency ranges.

Combinations of different types of sensors can be included in the systems shown in FIG. 7A-7B and FIG. 8. For example, it is suitable to include both shallow water and deep water hydrophones in a system. In addition, fiber optic sensors responsive to strain, acceleration, dynamic or static pressure, temperature, or other parameters, can also be included in the system.

Although the examples of FIG. 7A-7B and FIG. 8 show the hydrophones having one transmission fiber and six receiving fibers, it is also suitable to use one-fiber hydrophones, two-fiber hydrophones, or hydrophones with more or fewer transmitting or receiving fibers. It is noted that if one-fiber hydrophones are used, a coupler is needed to split the transmitted and received light between the LED and the photodetector, which can increase cost but decrease the size of the hydrophone.

For hydrophones having two or more fibers, the receiving fibers of the sensors can continue to the PIN photodetector, and the transmit fiber of the sensor can extend from the LED connector into the sensor. Additional optical connectors can also be included in-line in these optical paths.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A hydrophone comprising:
   a reflective diaphragm having an exposed face and a protected face,
   at least one transmitting multimode optical fiber having an end spaced apart from the protected face of the diaphragm positioned to emit light toward the diaphragm;
   a housing, wherein a cavity is defined by the diaphragm and the interior surface of the housing;
   an elastomeric material having gas-filled cells disposed in the cavity; and
   a reservoir, wherein a first port between the cavity and the reservoir and a second port between the reservoir and the exterior of the hydrophone allow static pressure communication between the cavity and the exterior of the hydrophone.

2. The hydrophone according to claim 1, further comprising:
an optically transmissive liquid disposed in the cavity.

3. The hydrophone according to claim 2, wherein the optically transmissive liquid is a silicone oil.

4. The hydrophone according to claim 1, wherein the gas comprises air.

5. The hydrophone according to claim 1, wherein the elastomeric material having gas-filled cells is not located in the optical path between the optical fiber end and the diaphragm.

6. The hydrophone according to claim 1, wherein the elastomeric material comprises polyurethane with air-filled cells.

7. The hydrophone according to claim 1, wherein the elastomeric material includes about 15% air by volume at room temperature and pressure.

8. The hydrophone according to claim 1, wherein the elastomeric material includes between 10% and 20% air by volume at room temperature and pressure.

9. The hydrophone according to claim 1, further comprising:
a protective grate affixed to the housing and arranged external to the diaphragm.

10. The hydrophone according to claim 1, further comprising:
a plurality of multimode optical fibers surrounding the at least one transmitting optical fiber.

11. The hydrophone according to claim 1, wherein the diaphragm is disposed at an end of the hydrophone and the reservoir is disposed axially at an opposite end of the hydrophone.

12. The hydrophone according to claim 1, wherein upon a change in pressure external to the hydrophone, the diaphragm is deflected axially, modulating the intensity of the light received by the receiving multimode fibers.

13. A hydrophone comprising:
a reflective diaphragm having an exposed face and a protected face,
at least one transmitting multimode optical fiber having an end spaced apart from the protected face of the diaphragm positioned to emit light toward the diaphragm;
a housing, wherein a cavity is defined by the diaphragm and the interior surface of the housing, the housing having a port configured to allow static pressure communication between the exterior of the hydrophone and the cavity;
a compressible elastomeric material having gas-filled cells disposed within the cavity, wherein the material is not in the optical path between the transmitting optical fiber and the diaphragm; and
an optically transmissive liquid disposed in the cavity.

14. The hydrophone according to claim 13, wherein the optically transmissive liquid is a silicone oil.

15. The hydrophone according to claim 13, wherein the compressible elastomeric material comprises polyurethane, and the gas is air.

16. The hydrophone according to claim 15, wherein the compressible elastomeric material includes about 15% air by volume at room temperature and pressure.

17. The hydrophone according to claim 13, wherein the compressible elastomeric material includes between 10% and 20% air by volume at room temperature and pressure.

18. The hydrophone according to claim 13, further comprising:
a protective grate affixed to the housing and arranged external to the diaphragm.

19. The hydrophone according to claim 13, further comprising:
a plurality of multimode optical fibers surrounding the at least one transmitting optical fiber.

20. The hydrophone according to claim 13, wherein the housing includes at least one steel cylindrical tube.

* * * * *